Figure 2:
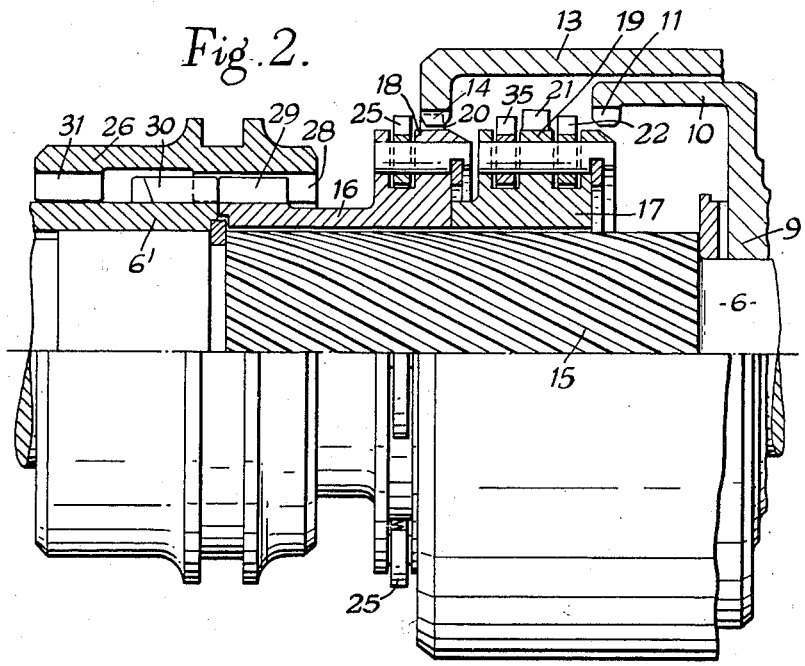

Nov. 20, 1956　　　H. SINCLAIR　　　2,770,979
CHANGE-SPEED GEARING
Filed Jan. 22, 1954　　　　　　　　　5 Sheets-Sheet 1
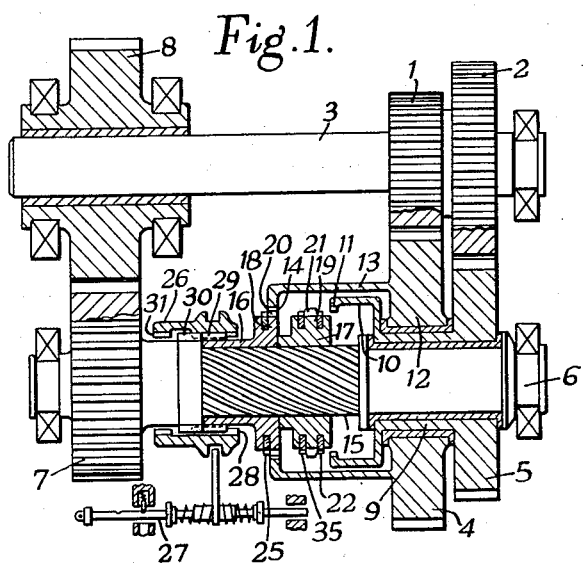
Fig.1.
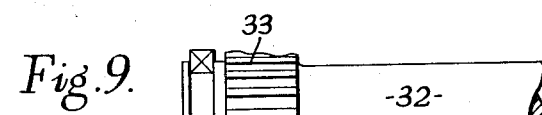
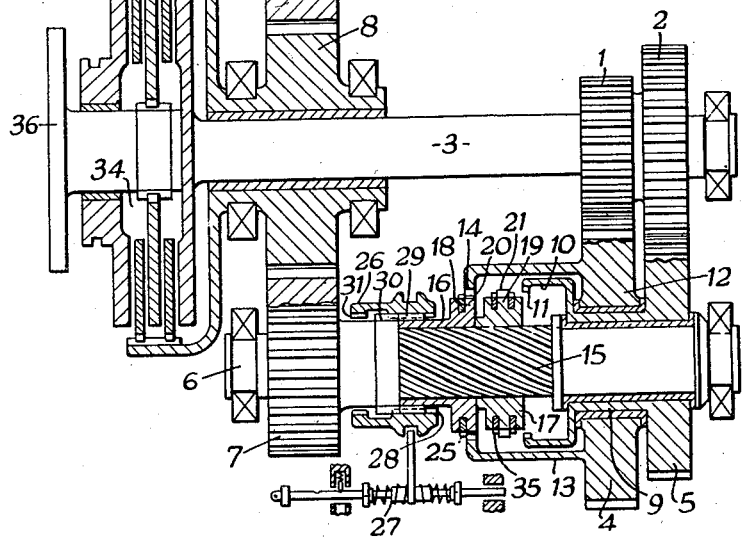
Fig.9.
INVENTOR
Harold Sinclair
BY
Benjamin Sweedler
ATTORNEY Nov. 20, 1956 H. SINCLAIR 2,770,979
CHANGE-SPEED GEARING
Filed Jan. 22, 1954 5 Sheets-Sheet 2

INVENTOR
Harold Sinclair
BY
Benjamin Sweedler
ATTORNEY

Nov. 20, 1956

H. SINCLAIR 2,770,979

CHANGE-SPEED GEARING

Filed Jan. 22, 1954

5 Sheets-Sheet 3

INVENTOR
Harold Sinclair
BY
Benjamin Sweedler
ATTORNEY

Nov. 20, 1956                H. SINCLAIR                2,770,979
                          CHANGE-SPEED GEARING
Filed Jan. 22, 1954                                5 Sheets-Sheet 4
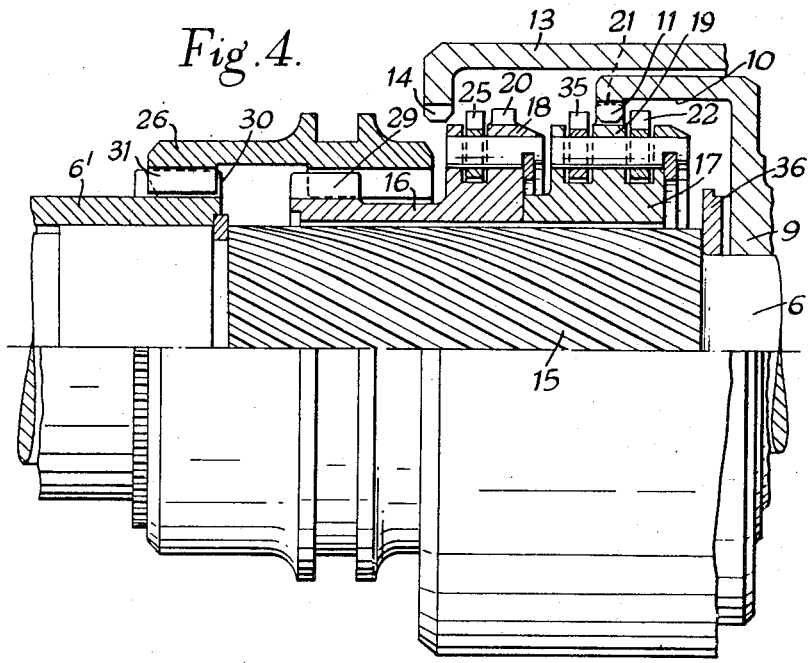
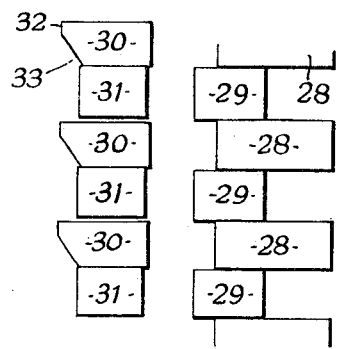
INVENTOR
Harold Sinclair
BY
Benjamin Sweedler
ATTORNEY Nov. 20, 1956  H. SINCLAIR  2,770,979
CHANGE-SPEED GEARING
Filed Jan. 22, 1954  5 Sheets-Sheet 5

INVENTOR
Harold Sinclair
BY
Benjamin Sweedler
ATTORNEY

United States Patent Office 2,770,979
Patented Nov. 20, 1956

2,770,979

CHANGE-SPEED GEARING

Harold Sinclair, Windsor, England

Application January 22, 1954, Serial No. 405,574

Claims priority, application Great Britain
January 9, 1951

9 Claims. (Cl. 74—339)

This invention relates to change-speed gearing incorporating coupling means of the synchronising type for conveying rotation between or preventing rotation of parts of change-speed gearing and thereby establishing a particular speed ratio in the gearing.

The type of coupling means with which this invention is concerned, and examples of which are described in British patent specification No. 410,083 and U. S. Patent No. 2,245,017, includes a toothed first member (which may be the driving member or a driven member or a stop member), a second member (which may be the driven or stop member, or the driving member respectively), an intermediate member so engaged with the second member as to be constrained to move helically with respect thereto in consequence of relative rotation between the intermediate and second members, the intermediate member having teeth engageable with the teeth on the first member, and a subsidiary ratchet drive adapted to couple together the first and intermediate members and so arranged as to effect engagement of the teeth of the first and intermediate members without clashing on relative angular displacement of the first and second members in one sense. In the preferred construction the subsidiary ratchet drive includes one or more pawls mounted on the intermediate member or on the first member and cooperating with teeth—preferably the said teeth—on the first or the intermediate member respectively.

In the normal operation of such synchronising coupling means, the torque load transmitted by the subsidiary ratchet drive is no more than that required to displace the intermediate member on the second member, since the arrangement is such that, during engagement together of the teeth on the first and intermediate members, the ratchet drive becomes inoperative before these teeth are fully engaged.

When two such synchronising couplings mechanically linked to move axially together or a multiple synchronising coupling (i. e. one having at least two first members alternatively engageable with a common intermediate member on a common second member) are or is used as a ratio-selecting coupling in change-speed gearing, abnormal conditions may arise when the shafts are stationary or practically stationary, such as the involuntary reversal of the input or the output shaft of the gearing during operation of the gear-changing control means, which abnormal conditions cause an unduly high torque to be applied to the subsidiary ratchet drives, and an object of this invention is to provide an improved construction which eliminates any risk of damage due to excessive torque on the subsidiary ratchet drives.

In accordance with the present invention there is provided change-speed gearing comprising at least two first toothed members, a second member, and two intermediate toothed members associated one with each of said first members and constrained for helical movement on said second member for engaging their teeth with and disengaging their teeth from the teeth of the respective first members for selectively establishing power paths of different ratios, each said intermediate member being provided with a ratchet drive for establishing driving engagement of the intermediate member with the respective first member without clashing, and the ratchet drives of the two intermediate members being of opposite hand.

Figure 3:
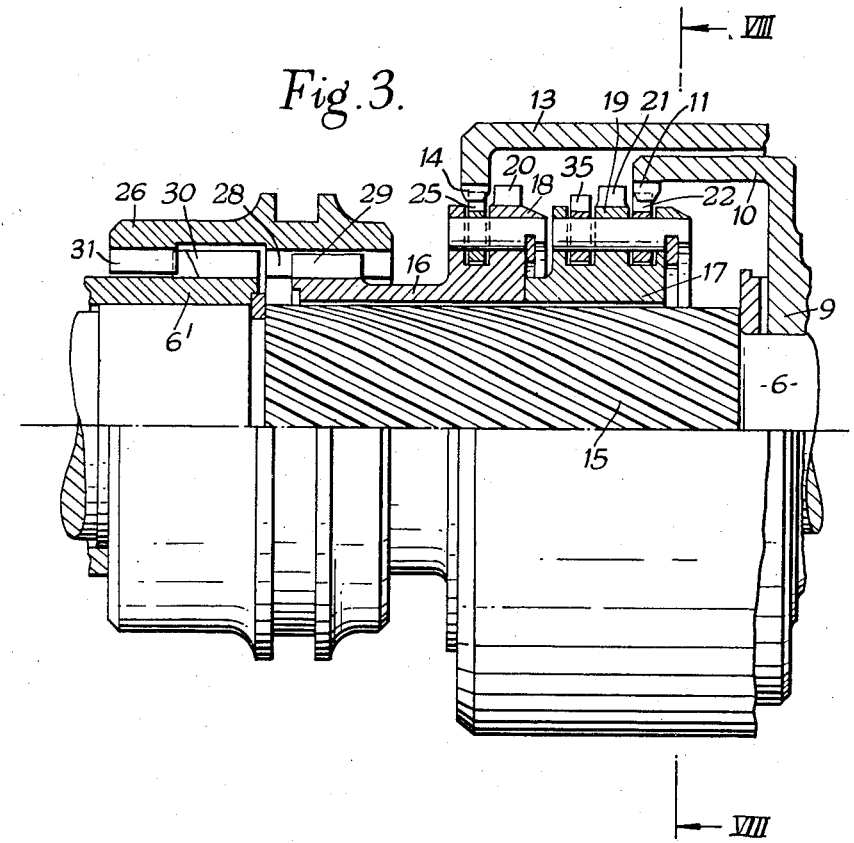

Embodiments of the invention are illustrated by way of example in the accompanying drawings in which Fig. 1 is a diagrammatic view in elevation showing the invention as applied to a gearing providing for two forward speeds, Figs. 2, 3 and 4 are views in elevation and on a larger scale than Fig. 1, showing a part of the gearing, with the parts in different positions, corresponding respectively to low speed drive, an intermediate position, and high speed drive.

Figure 5:
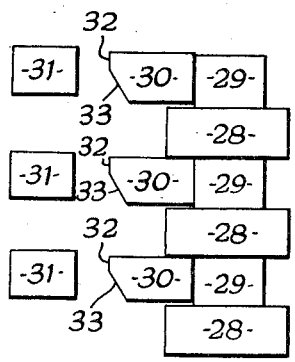
Figure 6:
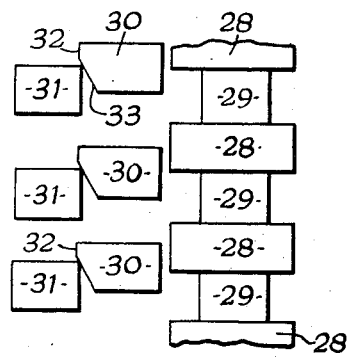
Figure 8:
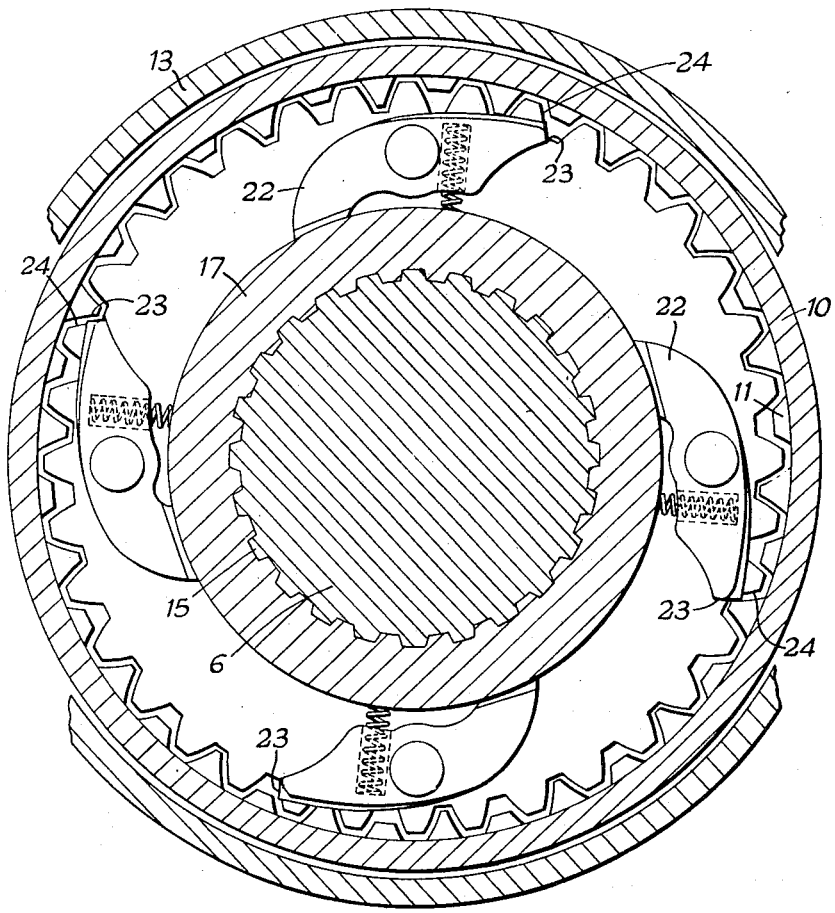
Figure 10:
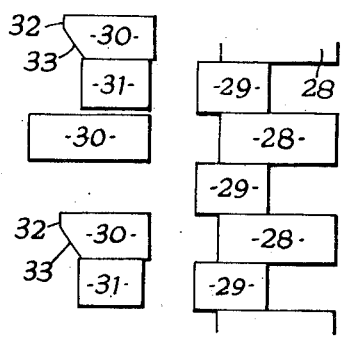

Figs. 5, 6 and 7 are projected and developed views of the splines of the left hand ends of Figs. 2, 3 and 4 respectively, Fig. 8 is a view in sectional elevation taken on the line VIII—VIII of Fig. 3, Fig. 9 is a diagrammatic view in elevation similar to Fig. 1 but showing a three-speed gear suitable for use for example in a diesel engined vehicle, and Fig. 10 shows an alternative arrangement of some of the splines of the gearing.

Referring to Figs. 1 to 8, low- and high-speed pinions 1 and 2 fast on an input shaft 3 are in constant mesh respectively with low- and high-speed gear wheels 4 and 5 co-axial with an output shaft 6, said output shaft in the case illustrated being shown as provided with a fixed pinion 7 meshing with a driven gear-wheel 8 freely rotatable on the shaft 3. For convenience of description it will be assumed that the high-speed train 2, 5 is at the rear end of the gearing, the low-speed train 1, 4 being in front of the high-speed train, and that the forward direction of rotation of the input shaft 3 is clockwise as viewed from the front or left hand end of Fig. 1. The high-speed wheel 5 is rigid with a hollow shaft 9 rotatable on the output shaft 6 and having at its front end a forwardly opening drum 10 containing a ring of jaw-clutch teeth 11 projecting radially inwards of the free end of the drum 10. The low-speed wheel 4 has a hub 12 rotatable on the high-speed hollow shaft 9 and is rigid with a sleeve 13 projecting forwards around the drum 10 and is provided at its front end with a ring of jaw-clutch teeth 14 projecting radially inwards of the free end of the sleeve 13 and spaced axially in front of the high-speed clutch teeth 11. The drum 10 and sleeve 13 form two toothed "first" members of a double synchronising coupling of the type hereinbefore specified. The common second member in this coupling is the output shaft 6 of the gearing, and is provided with right-handed helical splines 15 of steep pitch in well known manner.

Two intermediate members 16 and 17 are engaged on the helical splines 15 of the output shaft 6, the arrangement being such that said two members 16 and 17 are capable of making axial screwing movements on the shaft 6 by virtue of the helical splines 15 either separately or in unison.

The two intermediate members 16 and 17 are provided with circumferential flanges, 18 and 19 respectively, and each flange carries a set of jaw-clutch teeth as shown at 20 and 21, projecting radially outwards.

The jaw-clutch teeth 20 on the member 16 and 21 on the member 17 mesh respectively and alternatively with the rings of the low- and high-speed clutch teeth 14 and 11 of the above-mentioned drum 10 and sleeve 13. The axial spacing of the rings of teeth 11 and 14 on the drum 10 and sleeve 13 is such that the sets of teeth 20 and 21 on the intermediate members 16 and 17, with said two members 16 and 17 in end-to-end contact with one another, can occupy a transitional position between but close to the rings of teeth 11 and 14, this transitional position being shown in Figs. 3 and 6.

On the intermediate member 17 and at the rear side of the flange 19 thereon is a set of four pawls 22 facing clockwise as viewed from the rear (see Fig. 8) and each having its nose 23 slightly in advance of the clockwise-facing flank 24 of the adjacent tooth of the set 21 on said member 17. On the intermediate member 16 and on the front side of the flange 18 thereon is a set of four pawls 25, similar in all respects to the pawls 22 on the member 17, as shown in Fig. 8 but facing counterclockwise as viewed from the rear, each pawl 25 having its nose projecting slightly beyond the counterclockwise facing flank of the adjacent tooth of the set 20 on the member 16.

A control member for initiating gear change is provided in the form of a sleeve 26 slidable on the output shaft 6 by means of a yielding spring linkage such as is shown at 27 in Fig. 1. The sleeve 26 is provided with internal splines 28 engaged with splines 29 formed on the front end of the intermediate member 16 and also adapted to engage with radially projecting splines or shaft dogs 30 formed on the sleeve 6' fast with shaft 6. The rear ends of the dogs 30 function as end stops limiting the forward movement of the intermediate member 16 axially of the shaft 6.

On the interior of the forward end of the control sleeve 26 are formed one or more splines or projections 31 which will be termed "rotational stops," said rotational stops 31 being disposed in register with the spaces between adjacent pairs of splines 28 of the control sleeve 26 and spaced in the axial direction from the ends of said splines 28 by a distance somewhat greater than the axial length of the shaft dogs 30. The forward ends of the shaft dogs 30 are shaped to provide a surface 32 normal to the axis of the shaft and a surface 33 which is inclined, in the circumferential direction, to the surface 32 (Figs. 5, 6 and 7) for a purpose to be described.

The movement of the control sleeve 26 axially of the output shaft 6 is controllable through the spring linkage 27 e. g. by means of a hand lever (not shown).

When driving in low-speed gear the teeth 20 on the intermediate member 16 are engaged with the low-speed clutch teeth 14 as shown in Fig. 2 and forward driving torque tends to screw the said member 16 forward, this movement however being prevented by contact of said member 16 with the axial abutment constituted by sleeve 6' fixed on the shaft 6.

In these conditions the teeth 21 and pawls 22 of the intermediate member 17 are out of the path of the high-speed clutch teeth 11 on the drum 10, and the control sleeve 26 is in its forward position in which its splines 28 are meshed in engagement with the splines 29 on the intermediate member 16 and with the dogs 30 fast on the sleeve 6', so as to lock the said member 16 in this low-speed gear position. This position of the parts is shown in Figs. 2 and 5.

To change from the low- to the high-speed ratio, when driving in low gear, the control sleeve 26 is moved rearwards part-way towards the high-speed position, until the rotational stops 31 engage the flat parts 32 of the ends of the shaft dogs 30, and the splines 28 disengage from the shaft dogs 30, thus unlocking the intermediate member 16. The input shaft 3 is now retarded while the inertia of the load maintains the rotation of the output shaft 6 thus causing the intermediate member 16 to screw rearwards, i. e., to move axially and angularly, until its teeth 20 are out of engagement with the low-speed clutch ring teeth 14, the member 16 pushing the member 17 rearwards into a position in which there is momentarily a light nuzzling contact between the external teeth 21 on the member 17 and the internal teeth 11 of the high-speed clutch ring 10 and with the pawls 22 located within the ring of clutch teeth 11. The angular part of the screwing motion of member 16 brings the corners of the rotational stops 31 on to the inclined surfaces 33 of the shaft dogs 30.

Thereafter when the speed of the high-speed drum 10 tends to become less than that of the set of pawls 22 on the intermediate member 17, one of the pawls of that set engages a tooth of the high-speed ring of clutch teeth 11 so that the said member 17 is screwed axially rearwards on the shaft 6 synchronously into engagement with the high-speed ring of teeth 11, the extent of this movement of the member 17 being if necessary determined by an axial stop (not shown) on the shaft 6. The intermediate member 17 is followed up by the member 16 due to the reaction between the rotational stops 31 and the inclined end faces 33 of the shaft dogs 30, and when the teeth 21 of the member 17 are fully engaged the rotational stops 31 on the control sleeve splined to the member 16 slip past the surfaces 33 and become circumferentially aligned with the shaft dogs 30 to give driving torque engagement with said shaft dogs 30. In this position (Figs. 4 and 7) the pawls 25 on the intermediate member 16 are out of the path of the teeth 14 of the low-speed internal clutch ring, and the intermediate member 16 serves as an axial abutment for the member 17, which tends to screw forwards when driving in high-speed gear.

To change from the high-speed ratio to the low-speed ratio, the control sleeve 26 is urged forwards by the spring link 27, but so long as there is a driving torque on the high speed train, the load on the engaged rotational stops 31 and shaft dogs 30 prevents the control sleeve 26 from moving forwards until the torque load is momentarily relieved. When this occurs e. g. by momentarily interrupting the power input, the control sleeve 26 moves forwards due to the loaded spring link 27 so that the rotational stops 31 disengage from the shaft dogs 30. Thereafter the input shaft 3 is accelerated and the high-speed teeth 11 on the drum 10 are now able to screw the intermediate member 17 axially forwards on the output shaft 6 until its teeth 21 disengage from the high-speed ring of teeth 11. The intermediate member 17 being in end-to-end contact with the member 16, causes the member 16 to screw with it axially forwards on the output shaft 6 until the transitional position shown in Fig. 3 is reached in which the teeth 20 and 21 of both the intermediate members 16 and 17 are between and out of engagement with the low- and high-speed teeth of the rings 11 and 14. The sets of pawls 25 and 22 on the intermediate members 16 and 17 now ratchet over the low- and high-speed rings 14 and 11 of clutch teeth respectively, the intermediate members 16 and 17 remaining together in the transitional mid-position until the speed of the low-speed teeth 14 tends to exceed that of the set of pawls 25 on the intermediate member 16, whereupon one of the pawls 25 of that set engages a tooth of the low-speed ring of clutch teeth 14 so that the intermediate member 16 is screwed axially forward synchronously into engagement with the low-speed teeth 14 (being followed up by the intermediate member 17 due to the overrunning of its pawls 22). When the teeth 20 on the intermediate member 16 and the teeth 14 on the low-speed ring are fully in mesh, further forward movement of the intermediate members 16 and 17 helically on the output shaft 6 is prevented by the axial stop incorporating or constituted by the dogs 30 fast on the sleeve 6' (Figs. 2 and 5).

During a change from low- to high-speed ratio and vice versa, transitional conditions occur where the two sets of pawls 25 and 22 on the intermediate members 16 and 17 respectively are in register with the low- and high-speed clutch ring teeth 11 and 14 respectively, this transitional position being shown in Figs. 3 and 6 of the drawings.

The present invention is concerned with a circumstance which could occur if a single intermediate member were employed, as has previously been customary instead of the two separate intermediate members 16 and 17. Assume for example that the members 16 and 17 are joined together. In this case, if it should happen that the control sleeve 26 is in an unlocked position and, while the shafts 3 and 6 are stationary or practically stationary, the input shaft 3 is rotated backwards, then a pawl 22 will be engaged by a tooth 11 of the high-speed drum 10, and the single intermediate member will tend to be rotated backwards at a speed such that the pawls 25 move backwards faster than the teeth 14 of the low-speed drum 13. Such movement is clearly impossible with a single intermediate member, and the loads applied to the pawls 22 and 25 by the teeth 11 and 14 respectively may result in the pawls being damaged, as experience has shown.

However, with two intermediate members as at 16 and 17, the backward rotation of the member 17 is not communicated to the member 16, and the member 17 screws rearwardly away from the member 16, which remains with its pawls in ratcheting engagement with the backward moving teeth 14. The member 17 may screw into the engaged high-speed position. As described hereinafter, provision may be made for the member 17 to move so far rearwardly that its teeth 21 pass through the teeth 11 and a position is reached in which further pawls 35 ratchet past the teeth 11. If such provision is not made, the final position of the member 17 is the engaged high-speed position, and if when this position is reached the backward rotation of the shaft 3 is continued, the rotation of member 17 will be communicated, via shaft 6, to the member 16, and the interaction of the pawls 25 and teeth 14 will cause the member 16 to screw forwardly into the engaged low-speed position. In this position further rotation will be prevented by the simultaneous full engagement of the teeth 14 and 25, and also of the teeth 11 and 21, which teeth are capable of preventing further backward rotation without sustaining damage. In the case of a locomotive the driving wheels would become locked with the gearing in this condition, and would therefore slip on the rails.

When forward rotation of the input shaft 3 is resumed (with the output shaft stationary), the intermediate member 17, being free, will make a movement forwards on the shaft 6, into contact or near contact with the rear end of the intermediate member 16, as shown in Figure 2.

Thus is prevented the possible application of undesirable loads on the pawls 22 or 25 in the unlocked transitional position, as described above in relation to such a two-speed gear system, when the input shaft 3 is rotated backwards, under the particular conditions described.

In the three-speed gear arrangement shown in Fig. 9, 3 is the input shaft as before, and first and second gear conditions are achieved as in the case described above in connection with Figs. 1 to 8, the helically splined shaft 6 however being in this case a layshaft, and a separate output shaft 32 being provided having a pinion 33 fixed thereon and meshing with the gear wheel 8 on the shaft 3. The third gear condition is achieved through the engagement of a traction clutch 34 for clutching the gear wheel 8 directly to the driving shaft 36 on the vehicle. Such an arrangement is particularly suitable for use for example in a diesel engined locomotive, wherein it is common practice to provide forward and reverse gearing between the output shaft such as 32, and the driving wheels of such vehicles.

In the application of the present invention to a three-speed gear as shown in Fig. 9, the intermediate member 17 is provided with a further set of pawls 35 at the front side of the toothed flange 19 thereon as shown in Figs. 1 to 4, and facing anti-clockwise i. e. of opposite hand to the previously described set 22 at the rear side of the flange 19, and the amplitude of the axial movement permitted to the member 17 on the shaft 6 is made large enough for the toothed flange 19 to take positions at either the front or rear side of and close to the high-speed ring of clutch teeth 14.

With an arrangement of this kind, when third gear is engaged through the traction clutch 34 the intermediate member 16 takes the position as described for second speed gear in the previous example, in which both its teeth 20 and its pawls 25 are at the rear of and disengaged from the low-speed ring of clutch teeth 14, and the intermediate member 17 takes a position, against an axial stop 37, in which its teeth 21 have moved axially through the teeth of the second-speed ring of clutch teeth 11 and lie at the rear side thereof with its front set of pawls 35 in overrunning engagement with said second-speed ring of clutch teeth 11.

In changing down from top or third-speed position under driving load conditions, disengagement of the traction clutch 34 will cause the second gear clutch ring 10 bearing the teeth 11 to speed up and the intermediate member 17 will be caused, when synchronism is reached, to move forwards, by the action of the pawls 35 at the front side of its toothed flange, into engagement with the second-speed clutch ring teeth 11 to drive in second gear, the extent of such movement of member 17 being determined by its end-to-end contact with the member 16 which in turn serves as an abutment, being located by the rotational stops 31 on the control sleeve 26 in driving engagement with the shaft dogs 30.

With this arrangement when the teeth 20 and 21 on the intermediate members 16 and 17 are in the transitional position between first and second gear and the control sleeve is momentarily in the exceptional condition of being unlocked, reversal of the direction of rotation of the input shaft 3, due to involuntary backward movement of the vehicle when in forward gear, accompanied by an exceptional condition of dragging engagement of the traction clutch 34 will cause forward screwing of the member 16 towards or into the first gear position in which it is engaged with the teeth 14, while the member 17, which is always free, will be drawn rearwards toward or into or through the teeth 11 of the second speed clutch ring 10; in the last-mentioned position the front set of pawls 35 on the intermediate member 17 are then in overrunning relationship with said second speed clutch ring teeth 11.

When forward rotation of the input shaft 3 is resumed (assuming the traction clutch 34 now to be disengaged), the intermediate member 17 will make a return forward movement due to the action of its front set of pawls 35, into a position in contact or near contact with the member 16 (which is in first-speed gear position) and in which both the teeth 21 and the rear pawls 22 of the member 17 are disengaged from the second gear clutch teeth 11.

Thus in a three-speed gear system as described above there is prevented the application of undesirable loads on the pawls due to backward rotation of the input shaft resulting from dragging engagement of the traction clutch under the exceptional set of circumstances described above.

The sleeve 26 should be long enough to ensure that the splines 28 and 29 do not become disengaged from one another in the event of the sleeve 26 being moved forwards to the full extent when the part 16 is in its most rearward position, viz., when member 17 is up against the stop 37 which limits its travel to the rear, and member 16 is up against the member 17. An alternative expedient which may be adapted for the same purpose is to make at least one of the splines 30 suitably long and to omit a corresponding spline 31, as shown in Figure 10.

This application is a continuation-in-part of my copending application Serial No. 265,435 filed January 8, 1952, now abandoned.

I claim:

1. Change-speed gearing comprising at least two first toothed members, a second member and two intermediate toothed members associated one with each of said first members and constrained for helical movement on said second member for engaging their teeth with and disengaging their teeth from the teeth of the respective first members for selectively establishing power paths of different ratios, each said intermediate member being provided with a ratchet drive for establishing driving engagement of the intermediate member with the respective first member without clashing, and the ratchet drives of the two intermediate members being of opposite hand.

2. Change-speed gearing as set forth in claim 1, wherein a movable control member is provided in association with the said second member, for engagement with one of said intermediate members in such manner as to prevent relative movement between the said second members and said one intermediate member in at least one direction.

3. Change-speed gearing as set forth in claim 2, wherein the control member is engaged with one of said intermediate members for angular displacement therewith about said second member, and means are provided for effecting movement of said control member in both directions longitudinally of said second member, and abutment means are provided on said second member for engagement by a part of the control member to impose an angular displacement of the control member about said second member and thereby a movement of the said one intermediate member in one direction longitudinally of the said second member.

4. Change-speed gearing as set forth in claim 3 wherein said means for effecting movement of said control member are adapted to bias said member yieldingly in at least one direction.

5. Change-speed gearing comprising at least two first rotary driving members, a rotary driven member, two intermediate members mounted for helical movement on said driven member and selectively movable axially of said driven member, one of said intermediate members being provided with teeth engageable with the teeth of one of said first driving members and the other of said intermediate members being provided with teeth engageable with the teeth of the other said first driving members, and two subsidiary ratchet drives of opposite hand carried one by each of said intermediate members and so positioned that when either one of said intermediate members has its teeth drivingly engaged with the teeth of the associated driving member the other of said intermediate members has its ratchet drive in a non-ratcheting position and is drivably coupled with said one intermediate member for helical movement in unison therewith to initiate engagement, through said ratchet drive, of the teeth of said other intermediate member with the teeth of the associated driving member under the action of disengaging axial movement of said one intermediate member.

6. Change-speed gearing as set forth in claim 1, wherein one of said intermediate members is provided with a first axial stop which prevents movement of the said one intermediate member beyond its engaged position and the other of said intermediate members is provided with a second axial stop which permits movement of said other intermediate member through and beyond its engaged position, and said other intermediate member is provided with a further ratchet drive which when said second axial stop is operative is positioned to effect driven engagement of said other intermediate member.

7. Change-speed gearing as set forth in claim 1, including axial splines on one of said intermediate members, axial splines on said second member, and a control member provided with a first set of axial splines continuously engaged with the splines of said one intermediate member and provided with a second set of axial splines, said first set of control member splines being engageable with said splines of said second member when said one intermediate member is in driven engagement, whereby to prevent relative angular movement between said one intermediate member and said second member in at least one direction, and said second set of control member splines being engageable with said splines of said second member when said other intermediate member is in driven engagement whereby to prevent relative angular movement between said second member and said one intermediate member in at least one direction.

8. Change-speed gearing as set forth in claim 7, wherein of said set of splines on said second member and said second set of control member splines, at least one set has bevelled end surfaces whereby to impose an angular displacement of said one intermediate member relative to said second member in response to a biasing force applied to said control member in one axial direction.

9. Change-speed gearing including means providing, between a driving member and a driven member, two power paths of different forward speed ratios and comprising two synchronising couplings alternatively engageable for establishing two different forward speed ratios between said members, wherein the two synchronising couplings are constituted by two intermediate members movable helically with respect to said driven member, both in unison and relative to one another, an output member coupled to said driven member, and means operable to provide a third power path between said driving member and said output member, wherein one of the said two intermediate members is provided with a subsidiary ratchet drive, and the other of said intermediate members is provided with two subsidiary ratchet drives of opposite hand.

References Cited in the file of this patent
UNITED STATES PATENTS

| 2,202,271 | Sinclair et al. | May 28, 1940 |
| 2,224,322 | Sinclair et al. | Dec. 10, 1940 |
| 2,459,361 | Carnagua et al. | Jan. 18, 1949 |
| 2,505,842 | Sinclair | May 2, 1950 |
| 2,507,640 | MacDonald | May 16, 1950 |
| 2,515,114 | Chilton | July 11, 1950 |
| 2,559,740 | Sinclair | July 10, 1951 |